United States Patent Office 2,862,980
Patented Dec. 2, 1958

2,862,980

PROCESS FOR THE CHLOROMETHYLATING OF MONOSUBSTITUTED AROMATIC HYDROCARBONS

Werner Muench, Cesano Maderno, Luigi Notarbartolo, Milan, and Cesare Coen, Cesano Maderno, Italy, assignors to Perfogit Societa per Azioni, Milan, Italy No Drawing. Application May 9, 1955
Serial No. 507,174

Claims priority, application Italy June 3, 1954

3 Claims. (Cl. 260—651)

Our invention describes the direct chloromethylation of such aromatic hydrocarbons wherein one hydrogen atom has been replaced by a primary aliphatic radical.

It is well known that the chloromethylation of alkyl-monosubstituted aromatic hydrocarbons such as toluene, ethyl benzene, diphenyl ethane, para-phenyl butyric acid etc., obtainable by means of formaldehyde and hydrochloric acid, leads substantially to a mixture of hydrocarbons chloromethylated in positions 2 and 4.

Only with hydrocarbons in which the carbon atom directly linked to the aromatic nucleus is tertiary, for example, such as in cumene, the yield of parasubstituted compound is in most cases much higher, even without using special methods, the reaction itself being per se more unitary.

In the literature there are mentioned also processes according to which with compounds of the formula

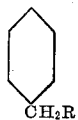

where R represents hydrogen or an organic radical, hydrocarbons chloromethylated only in 4-position (para-position) are obtained, but this statement has been proved to be incorrect. By chloromethylation, besides a negligible amount of impurities of high molecular weight, there is always obtained a mixture of ortho-substituted and para-substituted products, wherein the proportion of para-substituted product is only 50-55%. The course of the reaction is little unitary and, therefore, production on a large industrial scale is difficult, a great part of the product always representing an undesired by-product.

It has been found that if the reaction is carried out in the presence of some complex compounds of boron trifluoride, the proportional yield of the para-substituted product increases sensibly, so that the said boron trifluoride complexes may be considered as orienting reagents.

Said complex compounds may be preferably hydrates, but may also be alcoholates of boron trifluoride.

The fact that complex compounds of boron trifluoride produce such results is extremely surprising, since no reagent had been found able to orient the migration of the chloromethyl group into the para position of the benzene nucleus. The catalysts ordinarily employed in carrying out chloromethylation, such as sulphuric acid, zinc chloride and so on, may shorten the duration of the reaction or increase the yields, but they do not influence in any way the ratio between ortho-substituted compounds and para-substituted compounds. While in the presence or not of a catalyst such as zinc chloride or sulphuric acid the chloromethylation of toluene, for instance, yields about 50% each of ortho- and para-chloromethyl toluene. The reaction if it is carried out in the presence of a hydroxyl group containing boron trifluoride complex yields 70% and more of para-chloromethyl toluene. In the table below there are tabulated the yields of ortho- and para-compounds obtainable with conventional methods as compared with those obtained in the presence of boron trifluoride complexes. In all cases, the small amounts of impurities contained in the product distilled only once are computed as ortho-product.

TABLE

*The chloromethylation of toluene with various catalysts*

| No. | Addition | | | | T.° | Time, hours | Reaction product | | | |
|---|---|---|---|---|---|---|---|---|---|---|
| | Toluene (g.) | Paraformaldehyde (g.) | Catalyst | | | | Total amount (g.) | Yield percent calculated on (CH₂O)ₓ | Percent contents of isomers | |
| | | | Type | Total amount (g.) | | | | | Percent para | Percent ortho |
| 1a | 500 | 74 | HCl | 600 | 30 | 8 h. | 144 | 42 | 48 | 52 |
| 1b | 500 | 74 | HCl | 600 | 70-73 | 10 h. | 272 | 85 | 53 | 47 |
| 2a | 500 | 74 | HCl+H₂SO₄ | 600 50 | 30 | 10 h. 30′ | 86 | 25 | 51 | 49 |
| 2b | 500 | 74 | HCl+H₂SO₄ | 300 300 | 68-70 | 4 h. | 164 | 47.7 | 55 | 45 |
| 3a | 500 | 74 | HCl+ZnCl₂ | 400 100 | 30 | 14 h. | 124 | 36 | 52 | 48 |
| 3b | 500 | 74 | HCl+ZnCl₂ | 400 100 | 85 | 3 h. | 246 | 70 | 52 | 48 |
| 4 | 500 | 74 | BF₃+H₂O | 444 | 20-32 | 9 h. | 260 | 75.9 | 70.5 | 29.5 |

The yield of para-compound depends within certain limits on the concentration of the boron trifluoride complex, and the yield diminishes with the growing water content of the boron trifluoride solution. While with boron trifluoride mono-hydrate more than 75% of the total yield in para-isomer can be obtained, with a solution containing about 6 moles of water on one mole of boron trifluoride, the yield of para-isomer is diminished to only 65-67%.

As, during chloromethylation, there is formed one mole of water for every mole of chloromethyl compound, using the same catalyst solution again, the yield of para-isomer consequently decreases, owing to the increasing dilution. Hence it is necessary to regenerate the catalyst solution from time to time, by eliminating part of the water formed, as, for instance, by distilling the solution, preferably under vacuo.

Of course, to regenerate the catalyst liquid, other known methods may be used. Therefore it is possible, for example, to precipitate the boron trifluoride as a calcium or sodium salt and to regenerate it in gaseous form by means of heat decomposition or by addition of sulphuric acid. It is also possible to add to the aqueous boron trifluoride fairly large amounts of concentrated sulphuric acid, to separate the boron trifluoride in gaseous form by distillation and to collect it in water or in another solvent.

Furthermore, it is also possible to neutralize the water formed during the reaction by adding to the catalyst solution, as the aqueous component increases, a non-volatile strong acid such as concentrated sulphuric acid, phosphoric acid or toluene-sulphonic acid. The amount of these acids should be comparatively low, to avoid a loss of boron trifluoride.

It may happen that if working for some time with the same catalyst solution, boric acid begins to precipitate. In this case it is advisable to add aqueous or gaseous hydrofluoric acid in such amount as to dissolve again the boric acid separated, thus regenerating the complex of boron trifluoride. The preparation of boron trifluoride solutions to be employed as orienting reagent is carried out by methods known in the art. The most simple way is to dissolve boric acid or boric acid anhydride in a high percent hydrofluoric acid solution, but it is also possible to dissolve the boron trifluoride being prepared by any known method in well cooled water.

The carrying out of chloromethylation itself does not differ from the usual methods. The product to be chloromethylated, preferably an excess thereof, is overlayed with the catalyst solution, a strong current of gaseous hydrochloric acid is introduced under agitation and formaldehyde is added, preferably in the form of para-formaldehyde. The reaction starts immediately and is exothermic, whence temperature increases spontaneously. If needed, boron trifluoride solution may be employed together with conventional catalysts such as zinc chloride or sulphuric acid. Care should be taken, however, to avoid too elevated amounts of these substances as they would cause escape of boron trifluoride in gaseous form. At the beginning of the process, the best temperature of operation is about 20° C. Thereafter, according to the speed of introduction of hydrochloric acid and according to the amount of the batch, it may increase to 30–40° C. owing to the exothermic reaction which takes place. The reaction is then completed without any further heating. However, if using boron trifluoride as an orienting reagent, the yields of para-substituted products are quite independent of the temperature applied so that it is possible to operate even at much lower temperature, for example, at 10° C., as well as at a higher temperature, up to 100° C. and more.

The reaction time depends upon the product to be chloromethylated; in general, it lasts several hours.

The treatment of the product is effected according to the use for which it is intended to serve later. In any case it is useful to separate the aqueous layer from the oily layer at first and to then wash the oil with water or with an aqueous solution of sodium carbonate. For the preparation of the pure chloromethyl compound, the oil is dried and fractionated under vacuo. Since the chloromethyl group easily causes resinification especially if chloromethylated products are distilled in metallic apparatus equipment, for the case that the chloromethyl group is to be saponified, etherified or esterified in a following step, it is advisable to carry out the necessary operations with the crude product (for example, boiling the product with aqueous or alcoholic alkalis or with alkali acetate).

To illustrate the process, the following examples are given:

EXAMPLE 1

684 g. of ammonium fluoride ($NH_4F,HF$) and 494 g. of anhydrous boric acid ($B(OH)_3$) are heated to 110° C. With separation of water and ammonia, there are obtained 582 g. (90% of the theoretical amount) of the complex compound $(NH_4)_2O.4BF_3$. Said complex compound is then heated with 1452 g. of a 1:1 mixture of 7% oleum and sulphuric acid ($d=1.84$) to obtain generation of boron trifluoride. 220 g. of said boron trifluoride are absorbed in 74 g. of water kept at 0° C. and to the solution there are added further 42 g. of water at 0° C. to thus obtain a boron trifluoride dihydrate. To this solution there are added 500 g. of toluene and the solution is then saturated with gaseous hydrochloric acid under agitation; 74 g. of para-formaldehyde are added and the mixture is kept at 25–30° C. for eight hours, while continuously introducing a stream of gaseous hydrochloric acid. The oily layer is drawn off, washed, dried and distilled. 246 g. of a mixture of 4- and 2-chloromethyl-1-methyl benzene (B. P. 12 mm. 82–82.5° C.) are obtained (71.5% of the theoretical amount, calculated on formaldehyde). By means of oxydation with $KMnO_4$ the content of 4-chloromethyl-1-methyl benzene is determined to be 70.5%.

EXAMPLE 2

In order to apply the aqueous portion of the reaction mixture of Example 1 (396 g.), it is again reacted with 500 g. of toluene, 74 g. of para-formaldehyde and hydrochloric acid, as described above, but increasing the time of reaction to 10 hours. From the working up of the oily layer, a yield of 74% of the theoretical yield of chloromethylated product is obtained, of which 68% substituted in para-position. The same catalyst without being worked up gives with successive additions a slightly higher yield of chloromethyl toluene, the content of para-isomer wherein however slowly decreases. After two further additions, the content of para-isomer is about 64–65%. After 4 additions, the amount of the above described catalyst is 456 g. with a specific gravity $D_{20}=1.512$. These 456 g. are distilled under vacuo at 12 mm., with a temperature increase of from 23 to 57° C. 340 g. of residue ($D_{20}=1.630$) and 115 g. of water are obtained. With these 340 g. the reaction is repeated, as described in Example 1, and 295 g. (85% of the theoretical amount) of chloromethyl toluene (e. g. 12 84–86°) are obtained, which are composed of 69% para and 31% ortho-isomer. Prior to using the same catalyst further, 40% hydrofluoric acid is added thereto dropwise, to eliminate the little precipitated boric acid, until the liquid is no longer turbid; 30 g. are needed for this purpose.

EXAMPLE 3

To 288 g. of ethyl benzene and 168 g. of $BF_3(H_2O)_2$ are added 37 g. of paraformaldehyde under agitation, while cooling and introducing contemporaneously hydrochloric acid. Agitation is continued for 14 hours at about +5° C. and the reaction mixture is worked up as usual. 145 g. of chloromethyl ethyl benzene are obtained, the content of para-isomer in which is found to be 76% by determination through oxydation with nitric acid under pressure and separation of the terephthalic acid formed.

EXAMPLE 4

500 g. of toluene and 581 g. of boron trifluoride heptahydrate (with a boron trifluoride content of 192 g.) ($d=1.325$) are mixed with 80 g. of concentrated sulphuric acid ($d=1.84$), introducing contemporaneously gaseous hydrochloric acid and agitating continuously. 74 g. of para-formaldehyde are added and agitation is continued for 9½ hours, maintaining a temperature of 22–32° C. The mixture is separated as described in the preceding examples and 534 g. of an organic oil are obtained which after washing and distilling gives 250 g. of chloromethyl toluene (73% of the theoretical amount). The mixture has a boiling point of 81–87° C. at 12 mm. Hg and contains 64.8% of para-compound.

EXAMPLE 5

232 g. of gaseous $BF_3$ are prepared as described in Example 1, and are collected in 565 g. of 36% hydrochloric acid, cooling carefully to 0° C. In this way, the reaction is carried out with a cataylst corresponding to a $BF_3+6H_2O$. A supernatant layer of 500 g. of toluene is added to the mixture thus obtained, and is saturated under agitation with hydrochloric acid and contemporaneously cooled with running water. 74 g. of para-formaldehyde are added and introduction of hydrochloric acid into the mixture is continued at 60–70° C. for 9 hours. The floating oil is separated, washed, dried and distilled, obtaining 260 g. (73% of the theoretical amount) of chloromethyl toluene (e. g. $^{12}83$–$85°$). The content of para-chloromethyl toluene as determined by oxydizing with $KMnO_4$ and separating the terephthalic acid, is 67%. The remaining 33% is composed primarily of ortho-chloromethyl toluene.

What we claim is:

1. A process for chloromethylating an aromatic hydrocarbon chosen from the group consisting of toluene and ethyl benzene by treating the same with hydrochloric acid and formaldehyde in the presence of a hydrate of boron trifluoride whereby to direct the chloromethylation towards the production of para-substituted isomers, wherein the chloromethylation is carried out at a temperature between —10° and +100° C. and wherein the mol ratio of boron trifluoride to the hydrocarbon to be chloromethylated is between about 0.5 and 0.9.

2. A process for chloromethylating an aromatic hydrocarbon chosen from the group consisting of toluene and ethyl benzene by treating the same with hydrochloric acid and formaldehyde in the presence of a hydrate of boron trifluoride whereby to direct the chloromethylation towards the production of para-substituted isomers, wherein the chloromethylation is carried out at a temperature between —10° and +100° C. and wherein the mol ratio of boron trifluoride to the hydrocarbon to be chloromethylated is between about 0.5 and 0.9, and successively repeating the chloromethylation with fresh batches of the hydrocarbon in the presence of the same batch of boron trifluoride hydrate.

3. A process for chloromethylating a batch of an aromatic hydrocarbon chosen from the group consisting of toluene and ethyl benzene by treating the same with hydrochloric acid and formaldehyde in the presence of a batch of hydrate of boron trifluoride, repeating the chloromethylation several times with fresh batches of the hydrocarbon and the same batch of boron trifluoride hydrate, successively concentrating said batch of boron trifluoride hydrate by known methods, and using the same for further chloromethylations with fresh batches of the hydrocarbon, wherein the chloromethylation is carried but at a temperature between —10° and +100° C. and wherein the mol ratio of boron trifluoride to the hydrocarbon to be chloromethylated is between about 0.5 and 0.9.

References Cited in the file of this patent

UNITED STATES PATENTS

| | | |
|---|---|---|
| 2,246,900 | Schulze et al. | June 24, 1941 |
| 2,367,263 | Brown | Jan. 16, 1945 |
| 2,412,389 | Cass | Dec. 10, 1946 |
| 2,430,822 | Nevison | Nov. 11, 1947 |